US008998293B2

(12) United States Patent
Glickman

(10) Patent No.: US 8,998,293 B2
(45) Date of Patent: Apr. 7, 2015

(54) AIRFLOW CONTROL DEVICE FOR AN AUTOMOTIVE VEHICLE

(75) Inventor: David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 533 days.

(21) Appl. No.: 12/820,479

(22) Filed: Jun. 22, 2010

(65) Prior Publication Data

US 2011/0181075 A1 Jul. 28, 2011

(51) Int. Cl.

| | |
|---|---|
| ***B62D 25/08*** | (2006.01) |
| ***B60K 11/08*** | (2006.01) |
| ***B62D 37/02*** | (2006.01) |
| ***B62D 35/02*** | (2006.01) |
| ***B60R 19/03*** | (2006.01) |
| ***B60R 19/24*** | (2006.01) |
| ***B62D 35/00*** | (2006.01) |

(52) U.S. Cl.
CPC .............. *B62D 35/005* (2013.01); *B60K 11/08* (2013.01)

(58) Field of Classification Search
None
See application file for complete search history.

(56) References Cited

U.S. PATENT DOCUMENTS 4,119,339 A * 10/1978 Heimburger ............... 296/180.5
4,678,118 A * 7/1987 Fukami et al. ........... 237/12.3 B
4,770,457 A * 9/1988 Tomforde .................. 296/180.5
4,810,022 A * 3/1989 Takagi et al. ............. 296/180.5
4,917,434 A * 4/1990 Sumitani .................... 296/180.1
4,951,994 A * 8/1990 Miwa ......................... 296/180.1
4,976,489 A * 12/1990 Lovelace .................. 296/180.1
D316,390 S * 4/1991 Ichinose ...................... D12/181
5,080,410 A * 1/1992 Stewart et al. ................ 293/102
5,080,411 A * 1/1992 Stewart et al. ................ 293/122
5,080,412 A * 1/1992 Stewart et al. ................ 293/155
5,490,572 A * 2/1996 Tajiri et al. ................... 180/65.1
5,813,491 A * 9/1998 Sato et al. ..................... 180/309
6,070,933 A * 6/2000 Tsukidate et al. ......... 296/180.1
6,196,620 B1 * 3/2001 Haraway, Jr. .............. 296/180.5
6,405,819 B1 * 6/2002 Ohkura et al. ............... 180/68.1
6,644,700 B2 * 11/2003 Ito et al. ........................ 293/117
6,648,399 B2 * 11/2003 Ozawa et al. ............ 296/193.09
6,739,634 B1 * 5/2004 Pagan ........................... 293/117
7,222,894 B2 * 5/2007 Suwa ............................ 293/102
D556,655 S * 12/2007 Dixon .......................... D12/181
7,455,351 B2 * 11/2008 Nakayama et al. ........ 296/193.1
7,517,006 B2 * 4/2009 Kageyama et al. ...... 296/187.09
7,661,753 B2 * 2/2010 Shinedling et al. ........ 296/180.5
7,703,839 B2 * 4/2010 McKnight et al. ......... 296/180.5
7,766,111 B2 * 8/2010 Guilfoyle et al. ............ 180/68.1

(Continued)

FOREIGN PATENT DOCUMENTS

DE 2549493 C2 5/1987
DE 102009031777 A1 * 1/2011 .................... 293/155

(Continued)

*Primary Examiner* — Gregory Huson
*Assistant Examiner* — Eric Gorman
(74) *Attorney, Agent, or Firm* — Raymond L. Coppiellie; Brooks Kushman P.C.

(57) ABSTRACT

An airflow control device is mounted to the front end of an automotive vehicle and includes an upper air scoop section having a scoop channel disposed rearward of a bumper assembly and oriented to direct airflow entering a bumper intake opening toward an air-receiving powertrain component. A lower air dam section extends downwardly from the upper section to be positioned below a lower extent of the bumper assembly to deflect airflow away from an underside of the vehicle.

8 Claims, 4 Drawing Sheets

(56) References Cited

U.S. PATENT DOCUMENTS

| | | | | |
|---|---|---|---|---|
| 8,100,444 | B2 * | 1/2012 | Erzgarber et al. | 293/120 |
| 8,348,312 | B2 * | 1/2013 | Bailey | 293/115 |
| 8,517,451 | B2 * | 8/2013 | Kakiuchi et al. | 296/180.1 |
| 2001/0007395 | A1 * | 7/2001 | Gentile | 296/136 |
| 2003/0038488 | A1 * | 2/2003 | Kudelko et al. | 293/102 |
| 2005/0230162 | A1 * | 10/2005 | Murayama et al. | 180/68.1 |
| 2005/0280268 | A1 * | 12/2005 | Dehn et al. | 293/120 |
| 2006/0102399 | A1 * | 5/2006 | Guilfoyle et al. | 180/68.1 |
| 2006/0214469 | A1 * | 9/2006 | Aase et al. | 296/180.5 |
| 2007/0182171 | A1 * | 8/2007 | Kageyama et al. | 293/102 |
| 2007/0182174 | A1 * | 8/2007 | Nakayama et al. | 293/115 |
| 2008/0017138 | A1 * | 1/2008 | Rogg | 123/41.05 |
| 2008/0093868 | A1 * | 4/2008 | Steller | 293/142 |
| 2008/0272615 | A1 * | 11/2008 | McKnight et al. | 296/180.5 |
| 2009/0115221 | A1 * | 5/2009 | Shinedling et al. | 296/180.5 |
| 2009/0261601 | A1 * | 10/2009 | Shin | 293/115 |
| 2010/0052361 | A1 * | 3/2010 | Tortosa-Boonacker | 296/180.1 |
| 2010/0140976 | A1 * | 6/2010 | Browne et al. | 296/180.1 |
| 2011/0000728 | A1 * | 1/2011 | Mildner | 180/68.1 |
| 2011/0001325 | A1 * | 1/2011 | Bernt et al. | 293/155 |
| 2011/0097984 | A1 * | 4/2011 | Hasegawa et al. | 454/152 |
| 2012/0024611 | A1 * | 2/2012 | Ajisaka | 180/68.1 |
| 2012/0153681 | A1 * | 6/2012 | Ajisaka | 296/208 |
| 2013/0069389 | A1 * | 3/2013 | Meeks et al. | 296/180.1 |
| 2013/0244562 | A1 * | 9/2013 | Maurer et al. | 454/152 |
| 2013/0316634 | A1 * | 11/2013 | Ajisaka | 454/152 |
| 2014/0252802 | A1 * | 9/2014 | Lopez et al. | 296/187.04 |

FOREIGN PATENT DOCUMENTS

| | | | | | |
|---|---|---|---|---|---|
| JP | 04015124 | A | * | 1/1992 | B60K 11/04 |
| JP | 6227442 | A | | 8/1994 | |
| JP | 08164755 | A | * | 6/1996 | B60K 11/04 |
| JP | 2005138690 | A | * | 6/2005 | B60R 19/48 |
| JP | 2006096111 | A | | 4/2006 | |
| JP | 2006088735 | A | | 3/2010 | |

* cited by examiner 32
34
52a
48
46
55
44
52
40
42
16
20
18
18
24

26
34
58
16
30
28
20
18
30

AIRFLOW CONTROL DEVICE FOR AN AUTOMOTIVE VEHICLE

BACKGROUND

1. Technical Field

The present invention relates to devices for controlling the flow of air around the forward portion of an automotive vehicle while the vehicle is in motion, and more specifically to a device combining the functions of an air intake scoop and an air dam.

2. Background Art

Many automotive vehicles employ air dams (also known as front air spoilers) to improve aerodynamic efficiency, noise/vibration/harshness (NVH) characteristics, and other vehicle attributes.

Since an air dam deflects air away from the front area of the vehicle, it may not be compatible with the airflow needs of heat exchangers or other airflow-requiring components located in the engine compartment. For example, vehicles with turbocharged or supercharged engines may benefit from increased airflow through a charge air cooler (CAC).

Also, to effectively direct turbulent airflow away from the underside of the vehicle, air dams must often be large and extend downward close to the road surface. This may expose the spoiler to damage from raised obstacles or objects in/on the roadway. Visible reinforcement features, such as ribs or ridges, may be required for adequate strength, which may hurt the aesthetic appearance of the vehicle.

Air dams are often difficult to package on the vehicle, especially when the vehicle must also include an air scoop for intake purposes. To compensate, weight, cost, and even attachments must be added to execute the design

SUMMARY

In a disclosed embodiment, an airflow control device for an automotive vehicle is adapted to be mounted to a vehicle frame and comprises an upper section having at least one scoop channel disposed rearward of a bumper assembly and oriented to direct airflow entering a bumper intake opening toward an air-receiving powertrain component. The device further comprises a lower section extending downwardly from the upper section to be positioned below a lower extent of the bumper assembly to deflect airflow away from an underside of the vehicle. The airflow control device thus serves functions of both an air scoop and an air dam.

In another disclosed embodiment, a front end structure of an automotive vehicle comprises a vehicle frame, a front bumper assembly forward of the vehicle frame and having an air intake opening, and an airflow control device attached to the frame. The airflow control device comprises an upper section having a scoop channel disposed rearward of the bumper assembly and oriented to direct airflow entering the intake opening toward an air-receiving powertrain component, and a lower section extending downwardly from the upper section and positioned below a lower extent of the bumper assembly to deflect airflow away from an underside of the vehicle.

BRIEF DESCRIPTION OF THE DRAWINGS

Embodiments of the present invention will now be described by way of example only with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
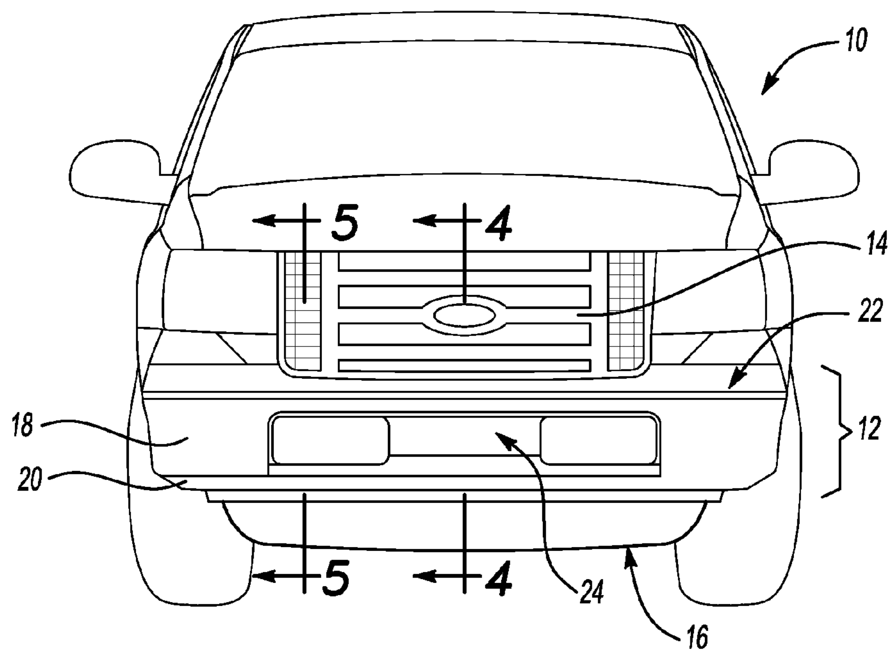
FIG. 1 is a front elevation view of an automotive vehicle having an airflow control device.
Figure 2:
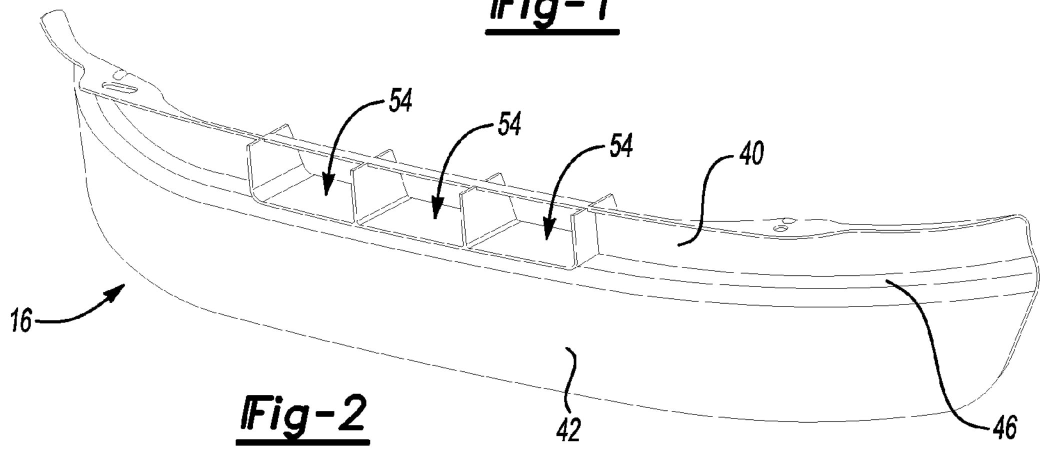
FIG. 2 is a frontal perspective view of an airflow control device.

Referring to FIG. 1, a front portion of an automotive vehicle 10 is shown to include a bumper assembly 12, a radiator air intake grille 14 above the bumper assembly, and an airflow control device 16, a lower portion of which is visible below the bumper assembly.

Bumper assembly 12 comprises at least a bumper beam 18, preferably formed from stamped steel or other high-strength material, and may also include various trim components that attach to and/or cover portions of the bumper beam and/or adjacent structure. For example, lower valence 20 covers a lower portion of bumper beam 18 (see FIG. 4) and an upper fascia 22 extends between radiator grille intake 14 and the bumper beam. Lower valence 20 and upper fascia 22 may be fabricated from any appropriate material, such as sheet metal or plastic. Bumper beam 18 has a generally rectangular central opening 24 to allow cooling airflow to enter the vehicle's engine compartment when the vehicle is in motion.

Figure 3:
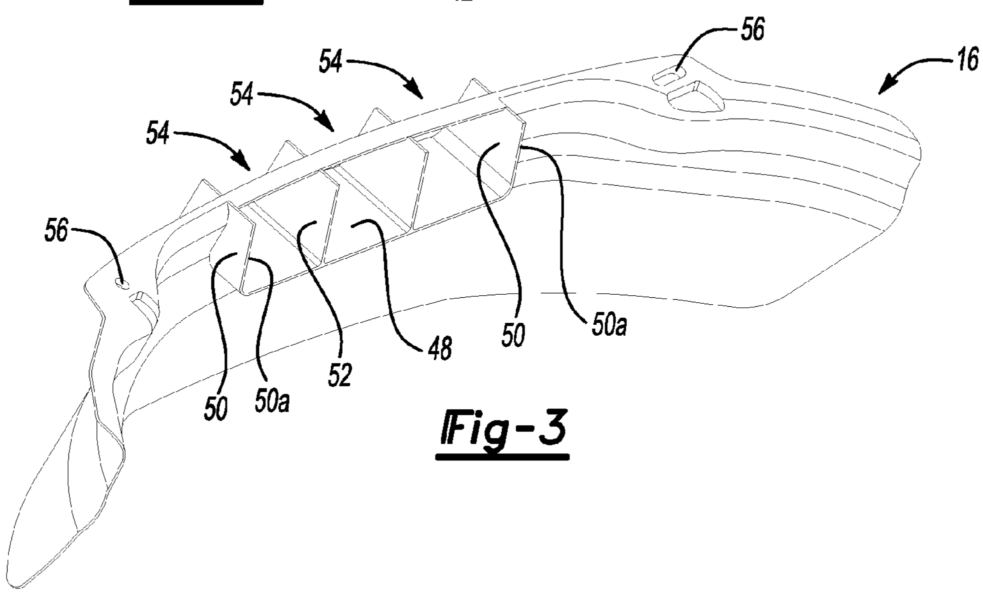
FIG. 3 is a rear perspective view of the airflow control device of FIG. 2.
Figure 4:
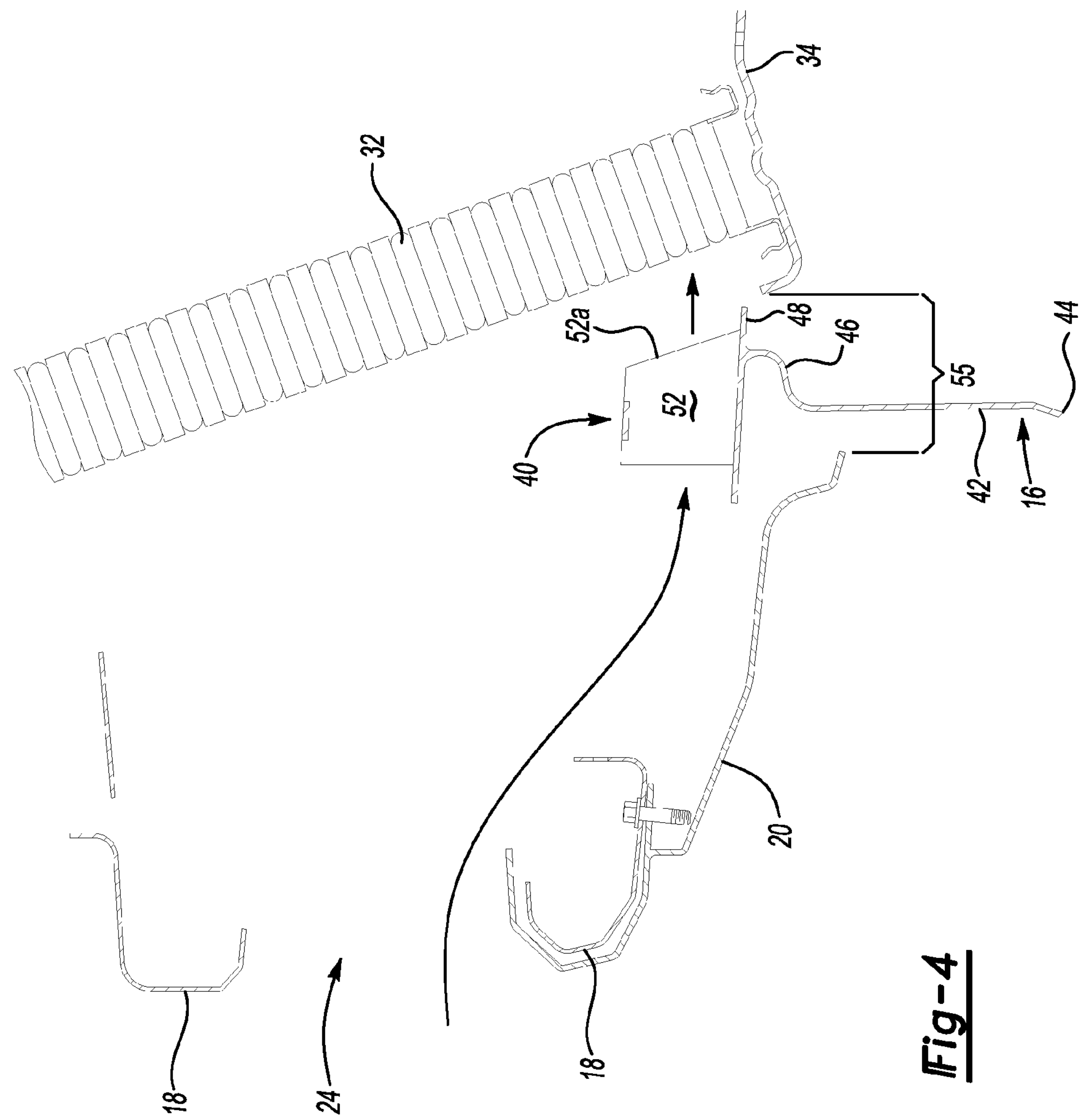
FIG. 4 is a partial cross sectional view taken along line 4-4 of FIG. 1.

Referring now to FIGS. 3 and 4, bumper assembly 12 is supported by frame rails 26 (only the right side frame rail being visible in FIG. 4). Bumper beam 18 may be attached to frame rail 26 by, for example, bumper bracket(s) 28 and bolts 30. A charge air cooler (CAC) 32 for an engine turbo-charging system is mounted to a CAC bracket 34 which extends laterally between and is bolted to the frame rails 26.

CAC 32 is located rearward of the bumper beam central opening 24 so that airflow entering the opening passes though the CAC heat exchanger. A lower portion of a radiator (not shown) for engine cooling may extend downward behind CAC 32 to receive cooling airflow after it has passed through the CAC.

Airflow control device 16 is attached to frame rail 26 by bolts 38 at left and right attachment locations. Airflow control device 16 is preferably formed of an appropriate plastic material having the correct combination of strength and flexibility. Thermoplastic polyolefin (TPO) is believed to be one such material. Airflow control device 16 generally comprises an upper scoop portion 40 positioned rearward of bumper beam 18 and lower valence 20, and a lower air dam portion 42 connected to and extending downwardly from the scoop portion. The lower edge 44 of air dam portion 42 preferably extends relatively close to the road surface in order to gain the greatest aerodynamic benefit.

Scoop portion 40 includes a bottom surface 48, two end walls 50, and two intermediate walls 52 that together define three laterally separated scoop channels 54. Bottom surface 48 is sized and located to at least partially occupy a lower opening 55 between lower valence 20 and CAC 32 so that airflow entering through bumper opening 24 is substantially blocked from flowing downward through the lower opening, but rather is directed through the lower portion of the CAC. It should be noted that some clearance between bottom surface 48 and lower valence 20 may be required to allow for flexing of the two parts while the vehicle is in use.

End walls 50 are spaced from one another by a distance generally matching the width of the heat-exchanger portion of CAC 32 so as to direct the maximum available volume of cooling airflow through the CAC. As seen in FIG. 4, CAC 32 may be tilted from vertical to allow the CAC to be of greater length and still fit into a given vertical space allowance. Trailing edges 50*a*, 52*a* of end walls 50 and intermediate walls 52, respectively, may be angled to be parallel to the front surface of CAC 32, as best seen in FIG. 4. The overall effect of scoop portion 40 is to increase the amount of airflow supplied to CAC 32 by preventing a portion of the airflow entering through bumper central opening 24 from escaping downward through the lower opening 55.

Figure 5:
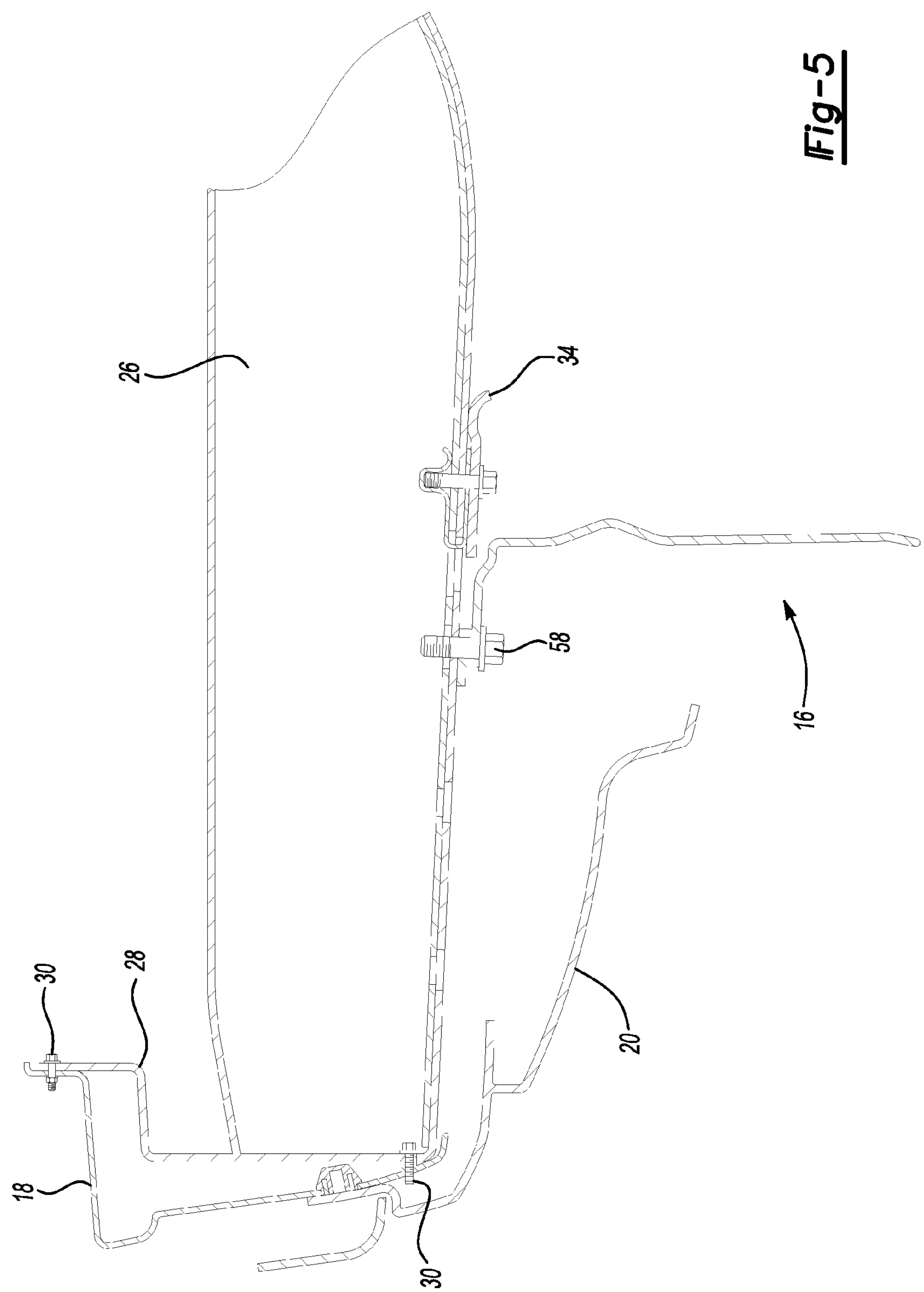
FIG. 5 is a partial cross sectional view taken along line 5-5 of FIG. 1.

Mounting holes 56 at spaced apart location on the upper lip of upper scoop portion 40 receive bolts 58 (see FIG. 5) or other appropriate fasteners to secure airflow control device 16 to frame rail 26.

Figure 6:
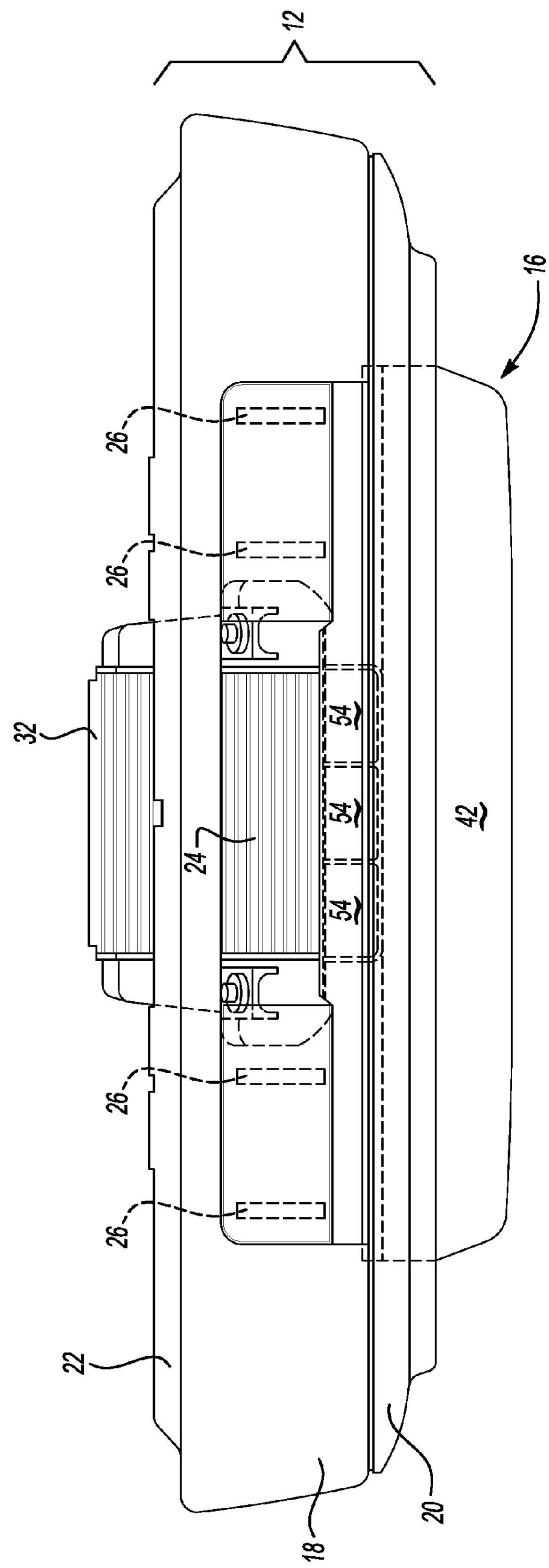
FIG. 6 is a front cut-away view of a vehicle showing the airflow control device.

As seen in FIG. 6, AFCD scoop channels 54 are located directly behind lower valence 20 and below air intake opening 24, thus positioning them in front of the lower edge of CAC 32.

Air dam portion 42 is connected to upper scoop portion 40 by an integrally-formed living hinge 46 extending across at least the central portion of airflow control device 16. Living hinge 46 may have a double-curved configuration (see FIG. 4), such as an S-shape, which allows air dam portion 42 to deflect or fold both rearwardly and forwardly with respect to upper scoop portion 40. The double-curved cross-section shape achieves enough flexibility to allow bi-directional bending/folding without any reduction in the thickness of the material in the region of the hinge, thereby maintaining superior overall strength of the part. This bi-directional folding is necessary to avoid damage to air dam portion 42 may otherwise occur if it is struck by a vertically projecting obstacle (curb, hump, snow bank, rock, log, etc.) that the vehicle passes over while travelling forward or backing up.

The ability of air dam portion 42 to deflect allows airflow control device 16 to be positioned farther forward relative to bumper assembly 12 and to extend closer to the surface of the roadway than would be the case with a rigid part. The disclosed air dam is allowed to project into the approach angle of the vehicle. The approach angle, as is well known in the automotive arts, is an imaginary line drawn tangent to the front tire and extending upward and forward to touch the bottom of the lowest point on the front vehicle structure. If the air dam extends into the approach angle it is more likely to be struck by obstacles as the vehicle begins to climb an incline and/or reverses down an incline and onto a flat surface. A non-deflectable air dam that extends into the approach angle may be damaged by contact with obstacles. But because the disclosed lower portion of airflow control device 16 may deflect without sustaining any damage, its normal (undeflected) position may be farther forward and lower, where it provides greater aerodynamic efficiency benefits.

While airflow control device 16 is shown and described in combination with CAC 32, it is likewise usable with any powertrain component that requires airflow and is located behind the front bumper, such as an engine cooling radiator or an air induction system.

Airflow control device 16 serves both as an air dam, improving aerodynamic efficiency, and as an air scoop, directing airflow entering through central opening 24 (and that would otherwise pass downwardly through the lower opening 55) toward CAC 32 (or other appropriate powertrain component), making efficient use of available packaging space and requiring attachment at only two points, thereby improving manufacturing efficiency. The AFCD allows vehicles with air-requiring components in the engine compartment to gain the benefits for an air dam. The scoop portion of the AFCD is hidden from view behind the bumper assembly, and the air dam requires no unsightly reinforcement features such as ribs or ridges.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A front end structure of an automotive vehicle comprising:

a left and a right forward frame rail laterally spaced from one another and extending longitudinally relative to the vehicle;

a front bumper beam formed of a high-strength material, supported by and forward of the frame rails, and having a centrally-located air intake opening;

a lower valence extending downward and rearward from the bumper beam to define a lower opening rearward of the lower valance and forward of an air-receiving powertrain component; and an airflow control device attached to and extending downward from the frame rails and comprising an upper section having a scoop channel disposed rearward of the bumper beam and oriented to prevent at least a portion of airflow entering the intake opening from passing through the lower opening and direct the airflow toward the air-receiving powertrain component, and a lower section extending downwardly from the upper section and through the lower opening such that a lower edge of the lower section is below a lower extent of the bumper beam, the lower section and the lower valence deflecting airflow passing below the bumper beam away from an underside of the vehicle.

2. The apparatus according to claim 1 wherein the scoop channel has a width matching a width of the air-requiring powertrain component.

3. The apparatus according to claim 1 wherein the scoop channel comprises a bottom surface positioned to at least partially block the airflow entering the bumper intake opening from passing through the lower opening.

4. The apparatus according to claim 1 wherein the scoop channel comprises at least one end surface having a trailing edge parallel with a forward face of the air-requiring powertrain component.

5. The apparatus according to claim 1 further comprising an integral hinge extending generally horizontally across at least a central portion of the airflow control device and connecting the upper portion and the lower portion to permit the lower portion to fold relative to the upper portion.

6. The apparatus according to claim 5 wherein the integral hinge has an S-shaped cross section permitting both forward and rearward folding.

7. An airflow control device for an automotive vehicle and comprising:

an upper section adapted for mounting below left and right vehicle frame rails laterally spaced from one another and extending rearward relative to the vehicle on respective left and right sides of a centrally-located airflow opening in a high-strength bumper beam supported by the frame rails, the upper section adapted to be positioned rearward of the airflow opening and adjacent to a lower opening rearward of the bumper beam and forward of an air-receiving powertrain component, the upper section preventing at least a portion of airflow entering the airflow opening from passing downward through the lower opening and direct the airflow toward the air-receiving powertrain component; and a lower section extending downwardly from the upper section and through the lower opening such that a lower edge of the lower section is below a lower extent of the bumper beam and configured to deflect airflow away from an underside of the vehicle, the lower section connected to the upper section by an integrally-formed hinge.

8. A front end structure of an automotive vehicle comprising:

a left and a right forward frame rail, the rails laterally spaced from one another and extending longitudinally relative to the vehicle;

a front bumper beam formed of a high-strength material, supported by and forward of the frame rails, and having a centrally-located air intake opening between the left and right frame rails;

an airflow control device attached to and extending downward from the frame rails, the device comprising: a) an upper section disposed rearward of the air intake opening and adjacent to a lower opening rearward of the bumper beam and forward of an air-receiving powertrain component to prevent at least a portion of airflow entering the air intake opening from passing downward through the lower opening and direct the airflow toward the air-receiving powertrain component; and b) a lower section extending downwardly from the upper section and through the lower opening such that a lower edge of the lower section is positioned below a lower extent of the bumper beam to deflect airflow passing below the bumper beam away from an underside of the vehicle.

* * * * *